United States Patent
Frank et al.

(10) Patent No.: US 10,133,051 B2
(45) Date of Patent: Nov. 20, 2018

(54) SELF CORRECTING FLOATING SIL TIP

(71) Applicant: FEI EFA, Inc., Fremont, CA (US)

(72) Inventors: Jonathan Frank, Los Gatos, CA (US); Prasad Sabbineni, San Ramon, CA (US)

(73) Assignee: FEI EFA, Inc., Fremont, CA (US)

( * ) Notice: Subject to any disclaimer, the term of this patent is extended or adjusted under 35 U.S.C. 154(b) by 99 days.

(21) Appl. No.: 14/645,273

(22) Filed: Mar. 11, 2015

(65) Prior Publication Data

US 2015/0260976 A1     Sep. 17, 2015

Related U.S. Application Data

(60) Provisional application No. 61/951,459, filed on Mar. 11, 2014.

(51) Int. Cl.
| | | |
|---|---|---|
| *G02B 21/02* | (2006.01) | |
| *G02B 21/33* | (2006.01) | |
| *G02B 7/02* | (2006.01) | |

(52) U.S. Cl.
CPC .............. *G02B 21/33* (2013.01); *G02B 21/02* (2013.01); *G02B 7/023* (2013.01)

(58) Field of Classification Search
CPC ........ G02B 21/02; G02B 21/33; G02B 21/00; G02B 27/0068; G11B 7/1374; G11B 7/1372; B29D 11/00394
See application file for complete search history.

(56) References Cited

U.S. PATENT DOCUMENTS

| | | |
|---|---|---|
| 3,436,159 A | 4/1969 | Harrick et al. |
| 3,524,694 A | 8/1970 | Klein |
| 3,711,186 A | 1/1973 | O'Connor |
| 3,912,378 A | 10/1975 | Goto |
| 4,002,407 A | 1/1977 | Maeda |
| 4,353,618 A | 10/1982 | Hagner et al. |
| 4,625,114 A | 11/1986 | Bosacchi et al. |

(Continued)

FOREIGN PATENT DOCUMENTS

| | | |
|---|---|---|
| CN | 1610843 A | 4/2005 |
| DE | 4244268 A1 | 7/1994 |

(Continued)

OTHER PUBLICATIONS

International Search Report and Written Opinion for PCT Application No. PCT/US2015/020025 dated Jul. 8, 2015.

(Continued)

*Primary Examiner* — Bumsuk Won
*Assistant Examiner* — Balram Parbadia
(74) *Attorney, Agent, or Firm* — Klarquist Sparkman, LLP (57) ABSTRACT

An optics arrangement for a solid immersion lens (SIL) is disclosed. The arrangement enables the SIL to freely tilt. The arrangement includes a SIL having an optical axis extending from an engaging surface and a rear surface of the SIL; a SIL housing having a cavity configured to accept the SIL therein while allowing the SIL to freely tilt within the cavity, wherein the cavity includes a hole positioned such that the optical axis passes there-through, to thereby allow light collected by the SIL to propagate to an objective lens; and, a SIL retainer attached to the SIL housing and configured to prevent the SIL from exiting the cavity.

18 Claims, 3 Drawing Sheets

(56) References Cited

U.S. PATENT DOCUMENTS

| | | | |
|---|---|---|---|
| 4,634,234 A | 1/1987 | Baumann | |
| 5,004,307 A | 4/1991 | Kino et al. | |
| 5,121,256 A | 6/1992 | Corle et al. | |
| 5,125,750 A * | 6/1992 | Corle | G01Q 80/00 359/356 |
| 5,208,648 A | 5/1993 | Batchelder et al. | |
| 5,220,403 A | 6/1993 | Batchelder et al. | |
| 5,247,392 A | 9/1993 | Plies | |
| 5,282,088 A | 1/1994 | Davidson | |
| 5,475,316 A | 12/1995 | Hurley et al. | |
| 5,497,359 A | 3/1996 | Mamin et al. | |
| 5,729,393 A | 3/1998 | Lee et al. | |
| 5,764,613 A | 6/1998 | Yamamoto et al. | |
| 5,852,232 A | 12/1998 | Samsavar et al. | |
| 5,910,940 A | 6/1999 | Guerra | |
| 5,939,709 A | 8/1999 | Ghislain et al. | |
| 5,940,545 A | 8/1999 | Kash et al. | |
| 5,948,972 A | 9/1999 | Samsavar et al. | |
| 6,094,413 A | 7/2000 | Guerra | |
| 6,229,600 B1 | 5/2001 | Martynov | |
| 6,252,412 B1 | 6/2001 | Talbot et al. | |
| 6,270,696 B1 | 8/2001 | Jain et al. | |
| 6,270,969 B1 | 8/2001 | Hartley et al. | |
| 6,301,055 B1 | 10/2001 | Legrand et al. | |
| 6,381,081 B1 | 4/2002 | Ford | |
| 6,411,442 B1 | 6/2002 | Ota et al. | |
| 6,441,359 B1 | 8/2002 | Cozier et al. | |
| 6,462,814 B1 | 10/2002 | Lo | |
| 6,487,161 B2 | 11/2002 | Maruyama et al. | |
| 6,507,433 B2 | 1/2003 | Mecham et al. | |
| 6,509,750 B1 | 1/2003 | Talbot et al. | |
| 6,591,121 B1 | 7/2003 | Madarasz et al. | |
| 6,594,086 B1 | 7/2003 | Pakdaman et al. | |
| 6,621,275 B2 | 9/2003 | Cotton et al. | |
| 6,744,568 B2 | 6/2004 | Kitamura et al. | |
| 6,778,327 B2 | 8/2004 | Pakdaman et al. | |
| 6,818,907 B2 | 11/2004 | Stark | |
| 6,822,800 B2 | 11/2004 | Koreeda et al. | |
| 6,831,782 B2 | 12/2004 | Patton et al. | |
| 6,934,024 B2 | 8/2005 | Zhan et al. | |
| 7,123,035 B2 | 10/2006 | Hanson et al. | |
| 7,227,702 B2 | 6/2007 | Pakdaman et al. | |
| 7,414,800 B2 | 8/2008 | Isobe et al. | |
| 7,466,852 B2 | 12/2008 | Cotton et al. | |
| 7,492,529 B2 | 2/2009 | Pakdaman et al. | |
| 7,639,025 B2 | 12/2009 | Hanson et al. | |
| 8,072,699 B2 | 12/2011 | Koh et al. | |
| 2002/0135891 A1 | 9/2002 | Kimura et al. | |
| 2003/0098692 A1* | 5/2003 | Cotton | G01R 31/311 324/537 |
| 2003/0210057 A1 | 11/2003 | Cotton et al. | |
| 2004/0212380 A1 | 10/2004 | Koyama et al. | |
| 2005/0030051 A1* | 2/2005 | Hanson | G01R 31/311 356/237.1 |
| 2007/0205795 A1 | 9/2007 | Pakdaman et al. | |
| 2011/0273687 A1* | 11/2011 | Leenders | G03B 27/42 355/53 |
| 2012/0092655 A1 | 4/2012 | Dozor et al. | |
| 2015/0185474 A1 | 7/2015 | Goldberg et al. | |

FOREIGN PATENT DOCUMENTS

| | | |
|---|---|---|
| DE | 60219360 T2 | 12/2007 |
| EP | 0977192 A1 | 2/2000 |
| EP | 1466194 B1 | 4/2007 |
| JP | 5-189796 A | 7/1993 |
| JP | 11-003534 A | 1/1999 |
| JP | 11-273132 A | 10/1999 |
| JP | 2000-171611 A | 6/2000 |
| JP | 2001-34998 A | 2/2001 |
| JP | 2002-236087 A | 8/2002 |
| JP | 4195921 B2 | 10/2008 |
| KR | 10-2008-0064912 A | 7/2008 |
| KR | 10-0870214 B1 | 11/2008 |
| KR | 10-0872751 B1 | 12/2008 |
| TW | I249622 B | 2/2006 |
| WO | 97/41556 A2 | 11/1997 |
| WO | 98/58288 A1 | 12/1998 |
| WO | 00/79313 A1 | 12/2000 |
| WO | 03/062864 A2 | 7/2003 |
| WO | 2005/043210 A1 | 5/2005 |
| WO | 2015/138647 A1 | 9/2015 |

OTHER PUBLICATIONS

Birkbeck, A.L., et al., "Laser Tweezer Controlled Solid Immersion Lens for High Resolution Imaging in Microfluidic and Biological Samples," SPIE Proceedings vol. 5275, University of California, San Diego, Jun. 1, 2005.

Buller, G.S., et al., "All-Solid-State Microscope-Based System for Picosecond Time-Resolved Photoluminescence Measurements on II-VI Semiconductors," Review of Scientific Instruments, American Institute of Physics, May 1992, p. 2994-2998, vol. 63, No. 5.

Buller, G.S., et al., "Time-Resolved Photoluminescence Measurements of InGaAs/InP Multipe-Quantum-Well Structures at 1.3-um Wavelengths by Use of Germanium Single-Photon Avalanche Photodiodes," Applied Optics, Feb. 1996, vol. 35, No. 6.

Charbonneau, S., et al., "Two-Dimensional Time-Resolved Imaging with 100-ps Resolution Using a Resistive Anode Photomultiplier Tube," Review of Scientific Instruments, Nov. 1992, vol. 63, No. 11, pp. 5315-5319.

Fletcher, D.A., et al., "Microfabricated Silicon Immersion Lens," Journal of Microelectromechanical Systems, vol. 10, No. 3, Sep. 2001.

Ghislain, L.P., et al., "Near-field Photolithography with a Solid Immersion Lens," Applied Physics Letters, vol. 74, No. 4, Jan. 1999.

Harrick, N.J., "Internal Reflection Spectroscopy," Interscience Publishers, Jan. 1967.

Harrick, N.J., "Study of Physics and Chemistry of Surfaces from Frustrated Total Internal Reflections," Physical Review Letters, vol. 4, No. 5, Mar. 1960.

Harrick, N.J., "Total Internal Reflection and its Application to Surface Studies," Annals of the New York Academy of Sciences, 101(3), 1963.

Heinrich, H.K., "Picosecond Noninvasive Optical Detection of Internal Electrical Signals in Flip-Chip-Mounted Silicon Integrated Circuits," IBM Journal of Research and Development, Mar. 1990, vol. 34, No. 2/3, pp. 162-172.

Holm, R.T., et al., "Internal-Reflection Spectroscopy," Laser Focus, vol. 15, Aug. 1979.

Jungerman, R.L., et al., "Phase Sensitive Scanning Optical Microscope," Applied Physics Letters, 45(8), pp. 846-848, Oct. 1984.

Khurana, N., et al., "Analysis of Product Hot Electron Problems by Gated Emission Microscope," IEEE/IRPS, 24th Annual Reliability Physics Symposium, Apr. 1986, pp. 189-194.

Knebel, D., et al., "Diagnosis and Characterization of Timing-Related Defects by Time-Dependent Light Emission," Proceedings of 1998 International Test Conference (ITC '98), Oct. 1998, IEEE Catalog No. RS00191, Washington, D.C.

Kume, H., et al., "Ultrafast Microchannel Plate Photomultipliers," Applied Optics, Mar. 1988, vol. 27, No. 6.

Mertin, W., et al., "Contactless Gigahertz Testing," Proceedings of 1998 International Test Conference (ITC '98), Oct. 1998, IEEE Catalog No. RS000191, Washington, D.C.

Milster, T.D., "Chromatic Correction of High-Performance Solid Immersion Lens Systems," Japanese Journal of Applied Physics, Mar. 1999, vol. 38, No. 3B, pp. 1777-1779.

Moehl, S., et al., "Solid Immersion Lens-Enhanced Micro-Photoluminescence: principle and Applications," Institut fur Angewandte Physik, Universitat Karlsruhe, Karlsruhe, Germany, arXiv:physics/0207045v1, Jul. 2002.

(56) References Cited

OTHER PUBLICATIONS

Paniccia, M., et al., "Novel Optical Probing Technique for Flip Chip Packaged Microprocessors," Proceedings of 1998 International Test Conference (ITC '98), Oct. 1998, IEEE Catalog No. RS00191, Washington, D.C.

* cited by examiner

SELF CORRECTING FLOATING SIL TIP

RELATED APPLICATION

This Application claims priority benefit from U.S. Provisional Patent Application No. 61/951,459, filed Mar. 11, 2014, the disclosure of which is incorporated herein by reference in its entirety.

BACKGROUND

1. Field

The disclosed invention relates to optical microscopy utilizing a solid immersion lens (SIL).

2. Related Arts

Solid Immersion Lenses are generally used in optical microscopes in order to collect light directly from the sample, without the light passing though the lower index of refraction, i.e., air. In such optical arrangements, it is desirable to maintain the SIL and objective optical axis alignment when placing and focusing the SIL on the sample. Additionally, in order to eliminate the air gap at the SIL-sample interface, sometimes a force or bias is applied to press the SIL against the sample. Otherwise, liquid, such as oil, may be placed between the sample and the SIL.

In a design described in U.S. Pat. No. 7,123,035, the SIL is fixedly attached to a SIL housing, and the objective lens is fixedly attached to an objective housing. Both the SIL housing and the objective housing are substantially cylindrical, with the SIL housing being received within the objective housing, and in a manner such that a sliding motion of the SIL housing relative to the objective housing is enabled in a biased fashion. One or more linear springs are disposed within the objective housing at its periphery, for biasing the SIL housing.

In a design described in U.S. Pat. No. 8,072,699 a solid immersion lens optics assembly is described. The design allows for minor tilt corrections to the board holding the sample, so as to align it to the SIL optical axis. However, not all systems have the capability to tilt the sample holder. Moreover, tilting the sample holder may introduce complications to the system, e.g., maintaining the integrity of wires connected to the sample. Also, tilting the sample holder may not be a good solution to compensate for minor local surface irregularities.

Accordingly a solution is needed in the art to enable easy and simple alignment of the SIL to the sample's surface.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various disclosed embodiments allow the solid immersion lens to freely tilt and passively position itself perpendicular to the surface of the sample, such as, e.g., wafer or semiconductor chip, without the need of tilting the sample or sample holder, in reference to the optics, or without the need to tilt the optics with respect to a sample. In this manner, the optical axis of the optical system remains aligned to the sample and only the SIL tilts to match the local surface of the sample.

An optics arrangement for a solid immersion lens (SIL) is disclosed. The arrangement enables the SIL to freely tilt. The arrangement includes a SIL having an optical axis extending from an engaging surface and a rear surface of the SIL; a SIL housing having a cavity configured to accept the SIL therein while allowing the SIL to freely tilt within the cavity, wherein the cavity includes a hole positioned such that the optical axis passes there-through, to thereby allow light collected by the SIL to propagate to an objective lens; and, a SIL retainer attached to the SIL housing and configured to prevent the SIL from exiting the cavity. The optics arrangement may further comprise a resilient element urging the SIL against the SIL retainer. The resilient element may comprise, e.g., a supporting ring connected to the SIL housing with springs and being urged by the springs against the rear surface of the SIL, or a gas inlet configured to deliver gas to the cavity and form a gas bearing to enable frictionless tilting of the SIL within the cavity. Also, a valve may be coupled to control rate of flow of gas to the inlet.

The SIL may freely tilt about a tilt axis passing perpendicularly to the optical axis. In one embodiment the tilt axis may pass through a center of a circle defined by radius of curvature of the rear surface of the SIL. The SIL may be conically shaped, resembling an ice cream cone. The optics arrangement may further comprise an objective lens housing and wherein the SIL housing is slidingly coupled to the objective lens housing.

Also disclosed is an optical microscope, comprising: a stage for holding a sample; an optical arrangement comprising: an objective housing; an objective lens positioned inside the objective housing; a SIL having an optical axis extending from an engaging surface and a rear surface of the SIL; a SIL housing having a cavity configured to accept the SIL therein while allowing the SIL to freely tilt within the cavity, wherein the cavity includes a hole positioned such that the optical axis passes there-through, to thereby allow light collected by the SIL to propagate to an objective lens; and, a SIL retainer attached to the SIL housing and configured to prevent the SIL from exiting the cavity.

A method is disclosed for inspecting a sample, comprising: placing the sample on a test bench; placing on optical arrangement over the sample, the optical arrangement comprising a solid immersion lens (SIL) inside a SIL housing and an objective lens inside an objective housing; floating the SIL within a cavity formed inside the SIL housing so as to enable the SIL to freely tilt; advancing the optical arrangement towards the sample such that engaging surface of the SIL physically touches the sample; and, sliding the SIL housing and objective housing with respect to each other to achieve focus. The step of floating the SIL may comprise injecting gas into the cavity.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

The invention is described herein with reference to particular embodiments thereof, which are exemplified in the drawings. It should be understood, however, that the various embodiments depicted in the drawings are only exemplary and may not limit the invention as defined in the appended claims.

DETAILED DESCRIPTION

According to one embodiment, the SIL tip is allowed to rotate/tilt around its own center point so as to conform to the surface of the sample. In this design the SIL tip is positioned in an annulus shaped mount or socket designed to float the tip on a cushion of fluid (e.g., air) or alternative medium. In addition the annulus shape allows the full numerical aperture (NA) of the light collected to pass through to the backing objective.

When the tip of the SIL approaches and comes into contact with the sample it will tilt around its own central axis (according to one embodiment on the cushion of air) until the surface of the tip is in flat contact with the sample.

As the system continues to move the objective towards the sample to obtain proper focus, it is possible to either maintain the ability of the SIL to rotate, or hold it in place. For example, the air pressure could be controlled to always have the tip float on its cushion of air in its mount, thereby enabling it to readjust its orientation as needed. Conversely, the air pressure could be controlled such that the air cushion collapses and the tip comes into physical contact with its mount or socket and is subsequently held in that position by higher friction.

Figure 1A:
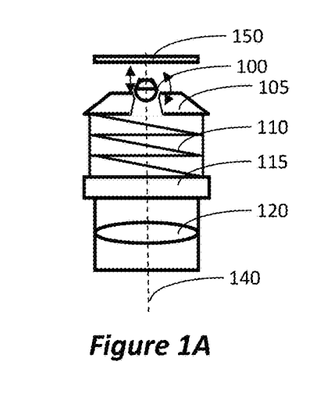
FIGS. 1A-1C are general schematics depicting how the SIL tilts about an axis perpendicular to its optical axis, so as to conform to the surface of the sample, according to disclosed embodiments.
Figure 1B:
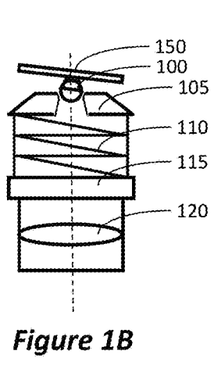
Figures 1C, 2A:
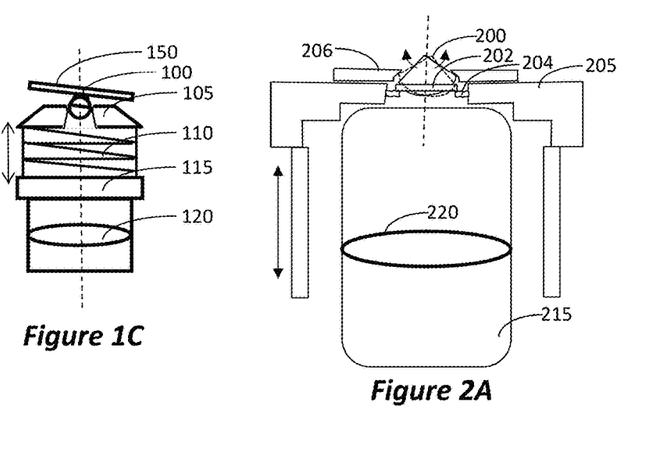
FIG. 2A is a schematic depicting a cross-section of one embodiment of a tilting SIL using mechanical bias.

FIGS. 1A-1C depict schematically how the SIL tilts about an axis perpendicular to its optical axis, so as to conform to the surface of the sample. In FIG. 1A, the SIL 100 is positioned inside a circular cavity of SIL housing 105. The objective 120 is positioned inside objective housing 115. The optical axis passing through the objective 120 and SIL 100 is depicted by broken line 140. SIL 100 is held inside the cavity such that it may tilt, as illustrated by the curved double-headed arrow, about an axis passing perpendicularly to the optical axis 140 in a direction into the page. In some embodiments, a small free-play is also provided, enabling linear motion of SIL 100 along its optical axis, as illustrated by the straight full double-arrow. More details explanation of embodiments enabling the tilt and linear motions will be provided below.

FIG. 1A shows the situation wherein the SIL is not yet contacting the sample 150. FIG. 1B illustrates the situation wherein the SIL 100 contacts the sample 150. In various circumstances the surface of the sample may be uneven or the surface may not be oriented perfectly perpendicular to the engaging surface of the SIL 100. These conditions are illustrated in FIGS. 1B and 1C by the exaggerated tilt in sample 150. As illustrated in FIG. 1B, upon contacting the sample 150, the SIL 100 tilts so that its engaging surface is parallel to the surface of the sample. In this respect, the reference to engaging surface of the SIL means the surface contacts the sample and collects the light from the sample.

FIG. 1C illustrates an embodiment wherein when the SIL 100 is pressed further onto the sample 150. Consequently, the resilient element 110, which connects the SIL housing 105 to the objective housing 115, contracts (see open double-arrow in FIG. 1C) such that the distance from the SIL to the objective is shortened to obtain focus. In this particular example, when the SIL is pushed against the sample 150, it physically engages the back surface of the cavity, such that its position is maintained and it becomes more difficult for the SIL to tilt further. In other embodiments, the SIL is maintained as "floating" within the cavity, such that it may always tilt freely.

FIG. 2A depicts a cross-section of one embodiment of a tilting SIL using mechanical bias. Elements in FIG. 2A that are similar to those in FIGS. 1A-1C are identified by the same references, except that they are in the 2xx series. The SIL shown in FIG. 2A differs somewhat from that shown in FIGS. 1A-1C, in that it has a conical shape resembling an ice cream cone. Due to the scale of the drawing it appears as if the engaging surface of the SIL is a sharp point, but it is only an artifact of the drawing. The engaging surface has an engaging area, not a sharp point. The rear surface of the SIL is the light exit surface and has a defined curvature having a defined radius. Therefore, the rear surface defines an imaginary circle having a center. In some embodiments the SIL is allowed to freely tilt about an axis passing through the center of the circle.

In FIG. 2A, SIL 200 is seated in a support ring 202. The support ring 202 allows the SIL 200 to tilt, as illustrated by the curved arrows and the "shadow" SIL illustrated in dashed line. The support ring 202 may be attached to the SIL housing 205 using elastic attachment, such as, e.g., springs 204. The elastic attachment 204 provides the bias to urge the SIL 200 against the sample. A SIL retainer 206 is provided over the SIL 200, in order to retain the SIL 200 in the support ring 202. As in the other embodiments, the SIL housing 205 may move linearly with respect to the objective housing 215, as shown by the double-headed arrow.

Figure 2B:
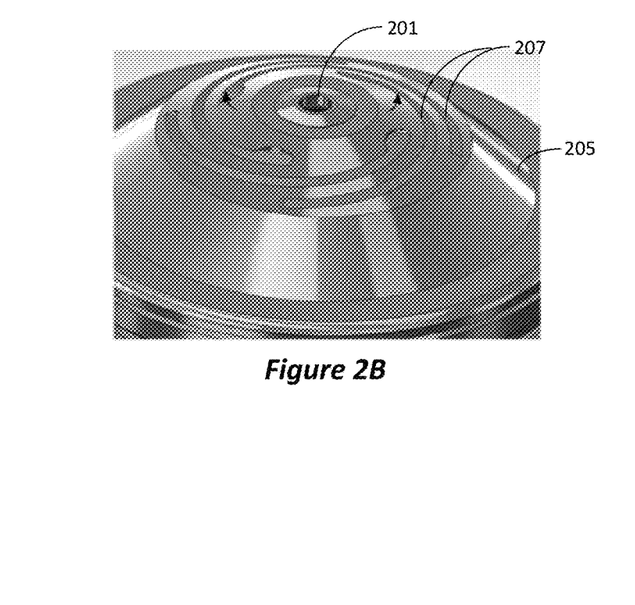
FIG. 2B is a schematic depicting another embodiment of a tilting SIL using mechanical bias.

FIG. 2B illustrates another embodiment wherein the tilt is enables by mechanical resilient element. In FIG. 2B the resilient element is formed by making the top part of SIL housing 205 form a symmetrical flexure element. This is achieved by making a plurality of elongated cuts 207 on the upper surface of SIL housing 205. In this embodiment a plurality of spiral cuts are made, wherein the spiral cuts interleaved so as to enable the top surface to resiliently bend in any direction, as shown by the curved arrows, thereby tilting the optical axis of the SIL. Note that in FIG. 2B only SIL cavity 201 is shown and the SIL itself removed for clarity.

Figure 3A:
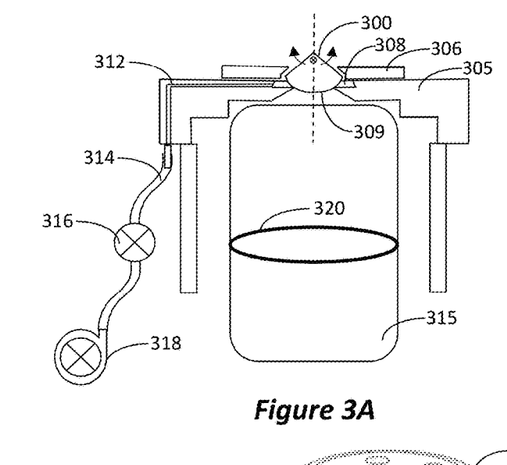
FIGS. 3A and 3B illustrate an example wherein the bias force is variable and may be dynamically controlled.
Figure 3B:
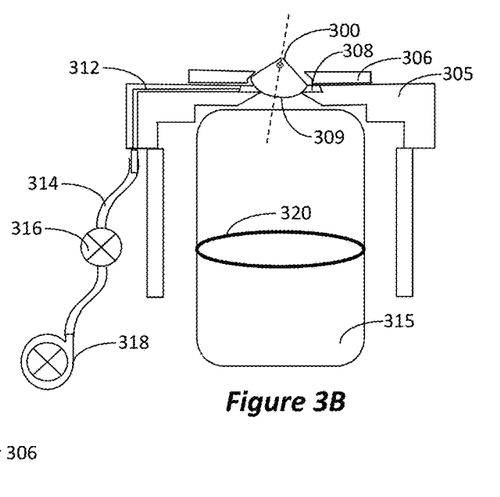
Figure 3C:
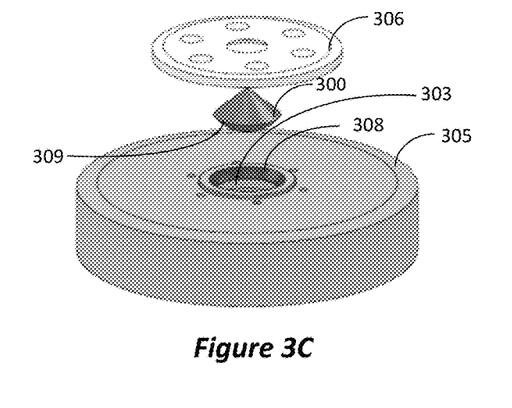
FIG. 3C illustrates an exploded view of the embodiment using a fluid bearing for tilting SIL.

In the embodiments of FIGS. 2A and 2B the bias is provided mechanically, using the elastic attachment 204 or resilient housing 205. Consequently, the bias force is quantized according to, e.g., the spring constant of spring 204 or resilient housing 205. FIGS. 3A-3C illustrate an example wherein the bias force is variable and may be dynamically controlled. In FIG. 3 the bias is controlled using fluid pressure utilizing, for example gas, air or hydraulic pressure to float the SIL 300.

In FIG. 3A the SIL 300 is illustrated in its non-tilted orientation, while in FIG. 3B the SIL 300 is shown in a tilted orientation. Elements in FIGS. 3A and 3B that are similar to those in FIGS. 1A-1C are identified by the same references, except that they are in the 3xx series. In FIGS. 3A and 3B, the SIL 300 is positioned within an air bearing 308, which is generally a cavity machined in the SIL housing 305. The SIL retainer 306 ensures that the SIL 300 does not fall out of the air bearing 308. Conduits 312 are provided to deliver fluid to the air bearing 308. A hose 314 is coupled between the conduits 312 and a valve 316 and another hose 314 is coupled between the valve 316 and pump 318. Valve 316 may be electronically coupled to a controller to control its position and thereby control the pressure of air bearing 308.

As illustrated in FIGS. 3A and 3B, the SIL is housed within a cavity 308, which is machined to match the radius of the rear surface 309 of the SIL 300. This arrangement constrains the SIL 300 to only rotate around its radius, i.e., about an axis that passes through the center of an imaginary circle defined by the radius of the rear surface 309 of the SIL 300. This axis is oriented perpendicularly to the optical axis of the SIL. The optical axis is illustrated in dashed-line, and the tilt axis is illustrated by the crossed-circle, indicating that the axis is going into the page, but may be rotated 360° about that center point—all perpendicularly to the optical axis.

References made herein to "air bearing" relates to the structure of element 308, and not to the fluid used. In the most simplistic form air pressure may be indeed be used; however, in other embodiments other gases, e.g., argon, may be used, or alternatively liquid may be used, e.g., index-matching oil may be used to form a hydraulic bearing. The use of the air bearing (or hydraulic bearing) enables floating the SIL 300 within the void defined by the cavity 308 in the SIL housing 305 and the SIL retainer 306. Therefore, the disclosed bearing may be referred to as a floating bearing. Floating the SIL makes it very easy for the SIL 300 to assume an orientation with respect to the sample such that the engaging surface of the SIL 300 is parallel to the surface of the sample at the engagement point.

FIG. 3C illustrates an exploded view of the embodiment using a floating bearing for tilting SIL. The SIL 300 is seated in a precision machined floating bearing cavity 308. The cavity 308 is machined to match the curvature of the back surface 309 of SIL 300. A central hole 303 within the floating bearing enables the light collected by the SIL to pass through to the objective lens. A retaining plate 306 is attached to the SIL housing 305 to retain the SIL 300 within the cavity 308.

Thus, the various embodiments disclosed allow a SIL tip to conform to the tilt or irregularities of the sample surface with which it is to contact. In some embodiments the mechanism includes means for restraining the tip to only rotate around an axis that passes perpendicularly to the SIL's optical axis, to keep optical alignment to the backing objective. Also, the arrangement allows the full numerical aperture (NA) of the tip to propagate to the backing objective and to keep the tip in constant compliance with the sample. That is, regardless of the surface topology of the sample, the tip of the SIL is in fixed compliance with the sample's surface. A SIL retainer is provided to constrain the tip from falling out of the seat in which it is housed.

According to disclosed embodiments a method of microscopy is provided, including the steps of: floating the tip on a floating bearing or other medium such that it is near friction free; the SIL is housed within a cavity which matches the radius of the rear surface of the SIL tip and constrains the tip to only rotate around its radius; the cavity has annulus shape, such that the back of the SIL is only supported on its outer surface and allows the full NA of the SIL to pass through to the backing objective; the floating pressure of the air bearing is controlled to exceed that of the bias/force acting on the SIL, so as to couple the tip of the SIL to the sample, thus allowing the SIL to float and conform at all times. Alternatively, the floating pressure may be controlled to be below that of the bias/force acting to couple the tip to the sample, thereby allowing the floating feature to collapse and the SIL to rest in its cavity mount while in use.

Figure 4:
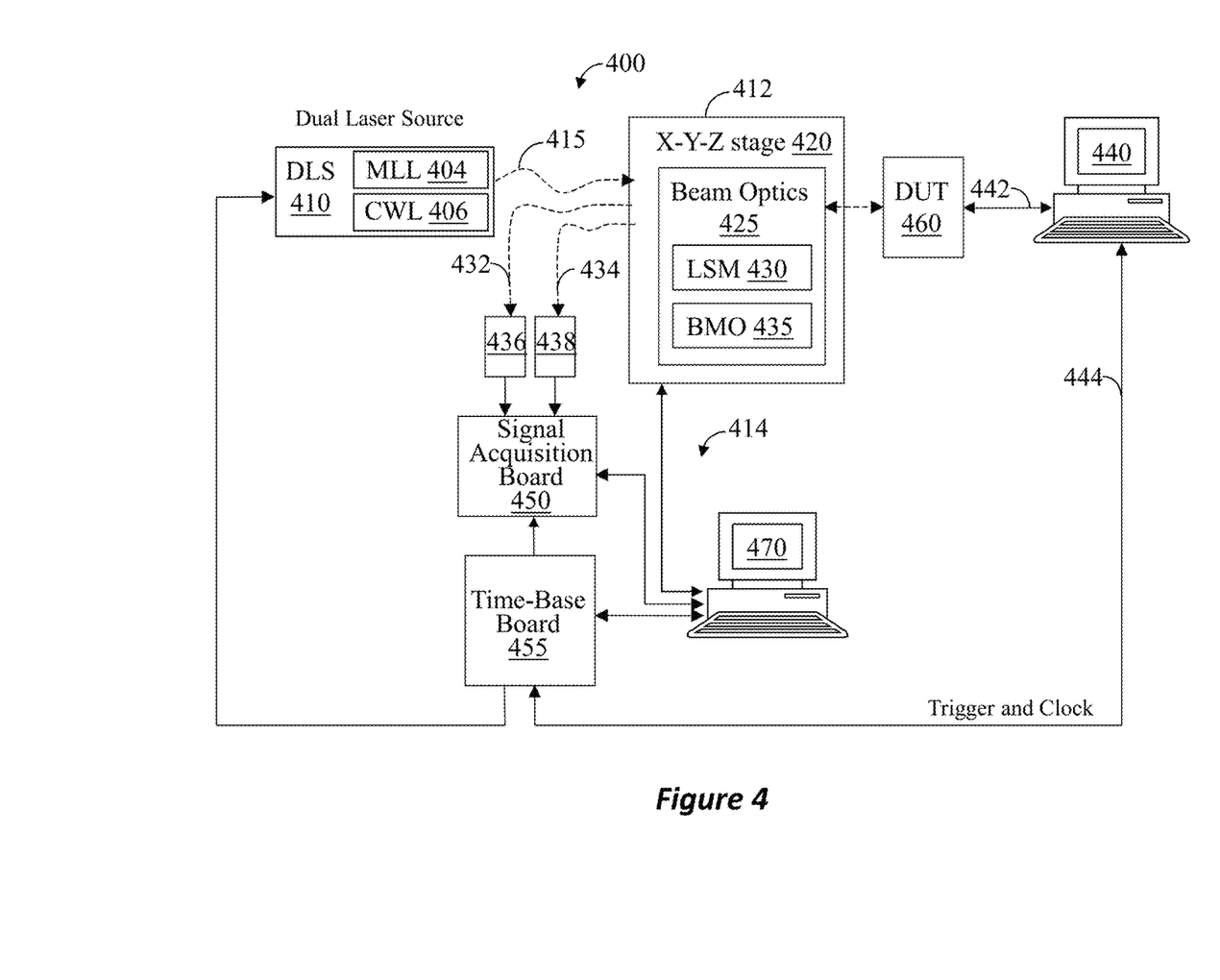
FIG. 4 is a general schematic of a system which may incorporate the disclosed tilting SIL and which may be used for inspecting, testing and debugging of semiconductor devices.

The disclosed embodiments may be implemented in various optical systems used for observation of exceedingly small features in the sample. The disclosed embodiments are especially suitable for optical systems used in the inspection and testing of semiconductor devices. A general schematic of such a system is illustrated in FIG. 4, and may be used for inspecting, testing and debugging semiconductor devices, generally referred to in the art as device under test ("DUT"). The system generalized in FIG. 4 may be, e.g., an emission microscope, a laser voltage prober (LVP), laser voltage imaging (LVI), laser assisted device alteration (LADA), etc. The reference numbers in FIG. 4 have no correlation to reference numbers in FIGS. 1A-3B. In FIG. 4, dashed arrows represent optical path, while solid arrows represent electronic signal path. The optical paths represented by curved lines are generally made using fiber optic cables.

Optical system 400 comprises a laser source which, in this particular example, is a dual laser source, DLS 410, an optical bench 412, and data acquisition and analysis apparatus 414. The optical bench 412 includes provisions for mounting the DUT 460. A conventional ATE tester 440 provides stimulus signals and receives response signals 442 to/from the DUT 460 and may provide trigger and clock signals, 444, to the time-base board 455. The signal from the tester is generally transferred to the DUT via test boards, DUT board (adapter plate) and various cables and interfaces that connect all of these components. Generally, the ATE and the optical testing systems are produced and sold by different and unrelated companies. Thus, the reference to the description of embodiments of the inventive system relate only to the optical testing system, and not to the ATE. That is, the ATE is not part of the optical testing system 400.

Turning back to the optical testing system 400, the time-base board 455 synchronizes the signal acquisition with the DUT stimulus and the laser pulses. Workstation 470 controls as well as receives, processes, and displays data from the signal acquisition board 450, time-base board 455, and the optical bench 412.

The various elements of optical system 400 will now be described in more detail. Since temporal resolution is of high importance in testing DUT's, the embodiment of FIG. 4 utilizes pulsed lasers, wherein the laser pulse width determines the temporal resolution of the system. Dual laser source 410 consists of two lasers: a pulsed mode-locked laser, MLL 404, source that is used to generate 10-35 ps wide pulses, and a continuous-wave laser source, CWL 406, that can be externally gated to generate approximately 1 us wide pulses. The MLL 404 source runs at a fixed frequency, typically 100 MHz, and must be synchronized with the stimulus 442 provided to the DUT 460, via a phase-locked loop (PLL) on the time-base board 455, and the trigger and clock signals 444 provided by the ATE tester. The output of the DLS 410 is transmitted to the optical bench 412 using fiber optics cable 415.

The light beam is then manipulated by beam optics 425, which directs the light beam to illuminate selected parts of the DUT 460. The beam optics 425 consists of a Laser Scanning Microscope (LSM 430) and beam manipulation optics (BMO 435). The specific elements that are conventional to such an optics setup, such as objective lens, etc., are not shown. Generally, BMO 435 consists of optical elements necessary to manipulate the beam to the required shape, focus, polarization, etc., while the LSM 430 consists of elements necessary for scanning the beam over a specified area of the DUT. The optical elements of the BMO 435 may includes the SIL arrangement as disclosed by any of the embodiments, so as to enable imaging of very small features within the DUT. In addition to scanning the beam, the LSM 430 has vector-pointing mode to direct and "park" the laser beams to anywhere within the field-of-view of the LSM and Objective Lens. The X-Y-Z stage 420 moves the beam optics 425 relative to the stationary DUT 460. Using the stage 420 and the vector-pointing mode of the LSM 430, any point of interest on the DUT 460 may be illuminated and probed.

For probing the DUT 460, the ATE 440 sends stimulus signals 442 to the DUT, in synchronization with the trigger and clock signals provided to the phase-locked loop on the time-base board 455. The phase-lock loop controls the MLL 404 to synchronize its output pulses to the stimulus signals 442 to the DUT. MLL 404 emits laser pulses that illuminate a particular device of interest on the DUT that is being stimulated. The reflected light from the DUT is collected by the SIL and is directed to the remaining optical elements of the beam optics 425, and is transmitted to photodetector 438 via fiber optic cable 434. The reflected beam changes character (e.g., intensity) depending on the reaction of the device to the stimulus signal.

Incidentally, to monitor incident laser power, for purposes of compensating for laser power fluctuations, for example, optical bench 412 provides means to divert a portion of MLL 404 incident pulse to photodetector 436 via fiber optic cable 432.

The output signal of the photosensors 436, 438, is sent to signal acquisition board 450, which, in turn, sends the signal to the controller 470. By manipulation of the phase lock loop on the time-base board 455, controller 470 controls the precise time position of MLL 404 pulses with respect to DUT 460 stimulus signals 442. By changing this time position and monitoring the photosensors signals, the controller 470 can analyze the temporal response of the DUT to the stimulus signals 442. The temporal resolution of the analysis is dependent upon the width of the MLL 404 pulse.

It is also known in the art to perform continuous wave LVP, wherein a continuous wave laser is used to illuminate a device on the DUT and the continuously reflected light is collected. The continuously reflected light contains timing information relating to the response, i.e., switching, of the active device to various stimulus signals. The reflected light signal is continuously converted into electrical signal by a photodetector, e.g., avalanche photodiode (APD), and is amplified. The timing information is contained within the electrical signal and represents detected modulation of the device, which can then be displayed in either the time-domain using an oscilloscope or in the frequency domain using a spectrum analyzer.

While the invention has been described with reference to particular embodiments thereof, it is not limited to those embodiments. Specifically, various variations and modifications may be implemented by those of ordinary skill in the art without departing from the invention's spirit and scope, as defined by the appended claims. Additionally, all of the above-cited prior art references are incorporated herein by reference.

The invention claimed is:

1. An optics arrangement for a solid immersion lens (SIL), comprising:
a SIL having an optical axis extending from an engaging surface and through a rear surface of the SIL situated opposite the engaging surface;
a SIL housing having a cavity configured to accept the SIL therein while allowing the SIL to freely tilt within the cavity, wherein the cavity includes a hole positioned adjacent the rear surface such that the optical axis passes there-through, to thereby allow light collected by the SIL to be emitted through the rear surface and to propagate to an objective lens;
a SIL retainer attached to the SIL housing and configured to prevent the SIL from exiting the cavity; and
a resilient element coupled to the rear surface and situated to movably urge the SIL against the SIL retainer;
wherein the resilient element comprises a supporting ring connected to the SIL housing with at least one spring and being urged by the at least one spring against the rear surface of the SIL.

2. The optics arrangement of claim 1, wherein the resilient element comprises a fluid inlet configured to deliver fluid to the cavity and form a floating bearing to enable tilting of the SIL within the cavity.

3. The optics arrangement of claim 2, further comprising a valve coupled to control rate of flow of fluid to the inlet.

4. The optics arrangement of claim 1, wherein the SIL freely tilts about a tilt axis passing perpendicularly to the optical axis.

5. The optics arrangement of claim 4, wherein the tilt axis passes through a center of a circle defined by radius of curvature of the rear surface of the SIL.

6. The optics arrangement of claim 1, wherein the SIL has a conical shape resembling an ice cream cone.

7. The optics arrangement of claim 1, further comprising an objective lens housing and wherein the SIL housing is slidingly coupled to the objective lens housing.

8. The optics arrangement of claim 1, wherein the SIL includes a frustro-conical surface portion.

9. The optics arrangement of claim 1, wherein the rear surface is curved.

10. An optical microscope, comprising:
a stage for holding a sample;
an optical arrangement comprising:
an objective housing;
an objective lens positioned inside the objective housing;
a solid immersion lens (SIL) having an optical axis extending from an engaging surface and through a rear surface of the SIL situated opposite the engaging surface;
a SIL housing having a cavity configured to accept the SIL therein while allowing the SIL to freely tilt within the cavity, wherein the cavity includes a hole positioned adjacent the rear surface such that the optical axis passes there-through, to thereby allow light collected by the SIL to be emitted through the rear surface and to propagate to the objective lens;
a SIL retainer attached to the SIL housing and configured to prevent the SIL from exiting the cavity; and
a resilient element coupled to the rear surface so that the resilient element is movably urging the SIL against the SIL retainer;
wherein the resilient element comprises a supporting ring connected to the SIL housing with at least one spring and being urged by the at least one spring against the rear surface of the SIL.

11. The optical microscope of claim 10, wherein the resilient element comprises a fluid inlet configured to deliver fluid to the cavity and form a floating bearing to enable frictionless tilting of the SIL within the cavity.

12. The optical microscope of claim 11, further comprising a valve coupled to control rate of flow of fluid to the inlet.

13. The optical microscope of claim 10, wherein the SIL freely tilts about a tilt axis passing perpendicularly to the optical axis.

14. The optical microscope of claim 13, wherein the tilt axis passes through a center of a circle defined by radius of curvature of the rear surface of the SIL.

15. The optical microscope of claim 10, wherein the SIL has a conical shape resembling an ice cream cone.

16. The optical microscope of claim 10, wherein the SIL housing is slidingly coupled to the objective lens housing.

17. The optical microscope of claim 10, wherein the SIL includes a frustro-conical surface portion.

18. The optical microscope of claim 10, wherein the rear surface is curved.

* * * * *